(12) United States Patent
Chakraborty et al.

(10) Patent No.: US 8,843,759 B2
(45) Date of Patent: Sep. 23, 2014

(54) METHODS, SYSTEMS, AND COMPUTER PROGRAM PRODUCTS FOR MEDIA-BASED AUTHENTICATION

(75) Inventors: Soumyajit Chakraborty, Harrison, NJ (US); James Gordon Beattie, Jr., Bergenfield, NJ (US); Carl Jacob, North Brunswick, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 13/596,187

(22) Filed: Aug. 28, 2012

(65) Prior Publication Data

US 2014/0068790 A1   Mar. 6, 2014

(51) Int. Cl.
*G06F 21/32* (2013.01)
*H04L 9/32* (2006.01)
*H04L 29/06* (2006.01)

(52) U.S. Cl.
CPC .............. *G06F 21/32* (2013.01); *H04L 9/3231* (2013.01); *H04L 63/0861* (2013.01)
USPC .............. 713/186; 726/28; 382/115; 382/124

(58) Field of Classification Search
None
See application file for complete search history.

(56) References Cited

U.S. PATENT DOCUMENTS

| | | | |
|---|---|---|---|
| 5,668,874 A | | 9/1997 | Kristol et al. |
| 6,219,794 B1* | | 4/2001 | Soutar et al. .................... 726/18 |
| 6,757,411 B2* | | 6/2004 | Chau ............................. 382/125 |
| 7,660,442 B2* | | 2/2010 | Sweeney et al. ............... 382/115 |
| 8,041,085 B2* | | 10/2011 | Dennard et al. ............... 382/125 |
| 8,233,720 B2* | | 7/2012 | Waragai et al. ................ 382/205 |
| 8,406,462 B2* | | 3/2013 | Radhakrishnan et al. ..... 382/100 |
| 8,417,960 B2* | | 4/2013 | Takahashi et al. ............. 713/186 |
| 8,542,878 B2* | | 9/2013 | Cennini et al. ................. 382/103 |
| 2003/0035569 A1* | | 2/2003 | Chau ............................. 382/124 |
| 2006/0050932 A1* | | 3/2006 | Tumey et al. .................. 382/116 |
| 2006/0204053 A1* | | 9/2006 | Mori et al. ..................... 382/118 |
| 2008/0025575 A1* | | 1/2008 | Schonberg et al. ............ 382/117 |
| 2008/0219515 A1* | | 9/2008 | Namgoong .................... 382/117 |
| 2008/0298642 A1* | | 12/2008 | Meenen ......................... 382/115 |
| 2009/0129635 A1* | | 5/2009 | Abe ............................... 382/115 |
| 2010/0150452 A1* | | 6/2010 | Kamei ........................... 382/202 |
| 2010/0278425 A1* | | 11/2010 | Takemoto et al. ............. 382/173 |
| 2011/0185176 A1* | | 7/2011 | Takahashi et al. ............. 713/168 |
| 2011/0304720 A1* | | 12/2011 | Kumar et al. .................... 348/77 |
| 2012/0163678 A1* | | 6/2012 | Du et al. ........................ 382/117 |
| 2012/0213422 A1* | | 8/2012 | Niskanen et al. .............. 382/118 |
| 2013/0011015 A1* | | 1/2013 | Jo et al. ......................... 382/103 |
| 2013/0182002 A1* | | 7/2013 | Macciola et al. .............. 345/589 |
| 2013/0243187 A1* | | 9/2013 | Horstmeyer et al. ........... 380/28 |

\* cited by examiner

*Primary Examiner* — Andrew Nalven
*Assistant Examiner* — Christopher Ruprecht
(74) *Attorney, Agent, or Firm* — Cantor Colburn LLP

(57) ABSTRACT

A method for generating an input key for authenticating access to a resource, the method including obtaining an input media; determining a reference point in the input media; sampling the input media in response to determining the reference point to define an input media sample; generating cell data from the input media sample; and generating the input key using the cell data.

16 Claims, 5 Drawing Sheets

METHODS, SYSTEMS, AND COMPUTER PROGRAM PRODUCTS FOR MEDIA-BASED AUTHENTICATION

BACKGROUND

The present disclosure relates generally to authentication, and more particularly, to methods, systems, and computer program products for media-based authentication.

Authentication is used in a myriad of applications. In one form, authentication involves the use of knowledge, for example, in the form of a personal identification number (PIN) or a password. Authentication may also be based on what one has in their possession, such as an employee badge used to provide access to facilities. Authentication may also be based on who you are, including biometric information such as fingerprint images, voice exemplars, retinal images, etc. One or more of these techniques may be combined to authenticate access to a resource.

BRIEF SUMMARY

Exemplary embodiments include a method for generating an input key for authenticating access to a resource, the method including obtaining an input media; determining a reference point in the input media; sampling the input media in response to determining the reference point to define an input media sample; generating cell data from the input media sample; and generating the input key using the cell data.

Other exemplary embodiments include an input unit for generating an input key for authenticating access to a resource, the input unit including an input device obtaining an input media; and an input processor for executing: determining a reference point in the input media; sampling the input media in response to determining the reference point to define an input media sample; generating cell data from the input media sample; and generating the input key using the cell data.

Other exemplary embodiments include a computer program product tangibly embodied on a non-transitory computer readable storage medium, the computer program product including instructions for causing a processor to execute a method, including: obtaining an input media; determining a reference point in the input media; sampling the input media in response to determining the reference point to define an input media sample; generating cell data from the input media sample; and generating the input key using the cell data.

Other exemplary embodiments include a method for authenticating access to a resource, the method including obtaining a reference media; determining a reference point in the reference media; sampling the reference media in response to determining the reference point to define a reference media sample; generating reference cell data from the reference media sample; generating a reference key using the reference cell data; receiving an input key; and comparing the input key to the reference key to authenticate access to the resource.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
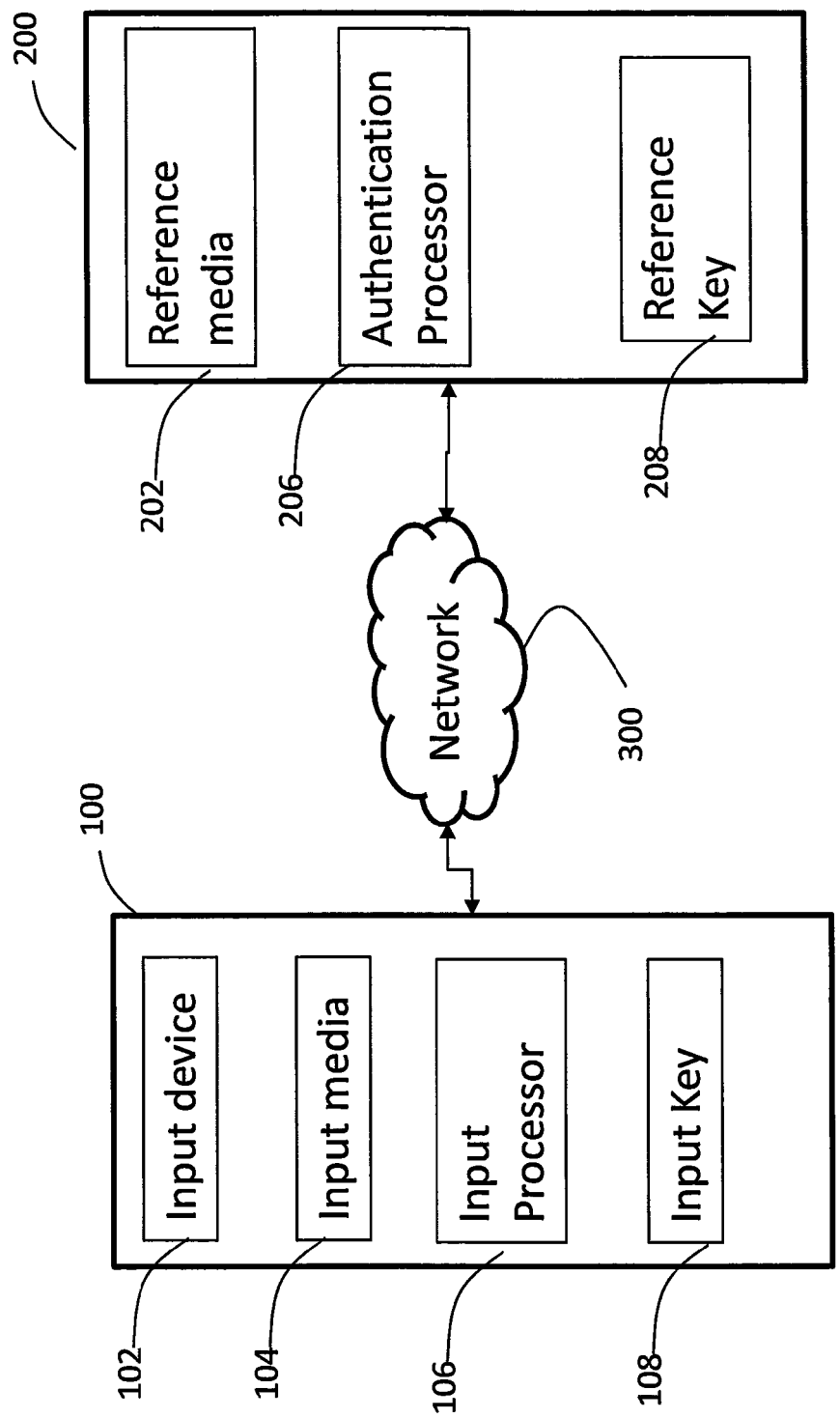
FIG. 1 depicts a system for authentication in an exemplary embodiment.

FIG. 1 depicts a system for authentication in an exemplary embodiment. The system includes an input unit 100 for obtaining media and generating an input key used for authentication, as described in further detail herein. An input device 102 obtains input media 104 to be used for authentication. Input media 104 is stored in the input unit 100 on a memory.

The input device 102 may be an imaging device for acquiring an image, such as a fingerprint or video. In one example, input device 102 is a scanner within a touch screen display. Alternatively, the input device 102 may be an audio recorder for acquiring an audio file. Input device 102 may also include a keypad or keyboard for entering a text string. Input device 102 may also include a port (e.g., USB port, network connection) for obtaining input media from storage devices external to the input unit 100. Further, multiple modes of media may be input, including one or more of image, video, audio, text, etc., to define the input media 104. It is understood that other types of media may be used, and embodiments are not limited to the exemplary media described herein.

An input processor 106 processes the input media 104 to generate an input key 108. Input processor 106 may be implemented using a general-purpose microprocessor executing a computer program stored in a memory. Input processor 106 processes the input media 104 to generate an input key 108 as described in further detail herein.

Input unit 100 communicates with an authentication unit 200 over a network 300. Network 300 may be any type of known network including, but not limited to, a wide area network (WAN), a local area network (LAN), a global network (e.g. Internet), a virtual private network (VPN), an intranet, or a combination thereof. The network(s) 300 may be implemented using wireless network technologies or any kind of physical network implementation known in the art.

Authentication unit 200 includes reference media 202, stored in a memory. Reference media 202 serves as a reference, and may be transferred from the input unit 100 to the authentication unit 200 upon initiation of an authentication service. For example, in an embodiment using fingerprint images, a user may obtain an image of a fingerprint and transmit that image to the authentication unit 200 to be stored as the reference media 202. An authentication processor 206 processes the reference media 202 to generate a reference key 208. Authentication processor 206 may be implemented using a general-purpose microprocessor executing a computer program stored in a memory. Authentication processor 206 compares the input key 108 to the reference key 208 to make an authentication determination as described in further detail herein.

Figure 2:
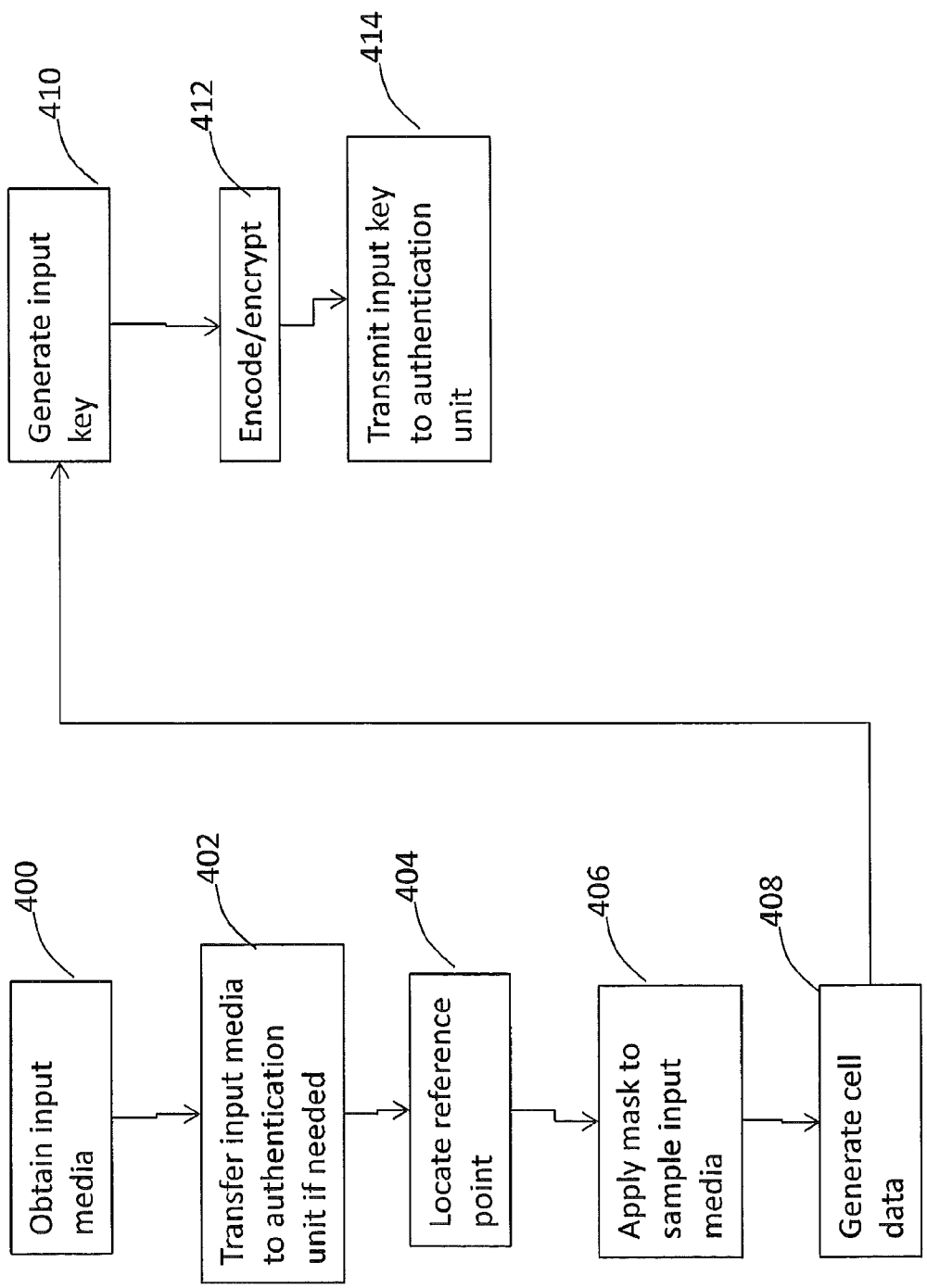
FIG. 2 depicts a process for generating an input key in an exemplary embodiment.

FIG. 2 depicts a process for generating an input key 108 in an exemplary embodiment. At 400, input unit 100 acquires the input media 104. In an exemplary embodiment, input media 104 is an image of a fingerprint. As noted above, however, input media 104 may be a different type of media, or include multiple types of media. If the input media 104 is new or updated, at 402 the input media 104 is transferred to authentication unit 200 for storage as the reference media 202. In this manner, both the input unit 100 and authentication unit 200 use the same media for key generation.

Figure 3:
FIG. 3 depicts input media in an exemplary embodiment.

At 404, input processor 106 begins generation of the input key 108 by locating a reference point in the input media 104. FIG. 3 depicts exemplary input media 104. Input processor 106 locates a reference point in the input media 104 by finding a feature. The feature may be a based on any characteristic of the input media 104, such as pixel intensity or color in an image, frequency of audio, etc. In the example of FIG. 3, input processor 106 locates a reference point 500 in a fingerprint image by analyzing loops and whirls in the fingerprint image. It is understood that other feature extraction techniques may used to identify the reference point 500. Further, the reference point may be defined based of more routine determinations (e.g., upper right corner of image, 23 seconds into audio file, the $88^{th}$ frame of a video).

Figure 4:
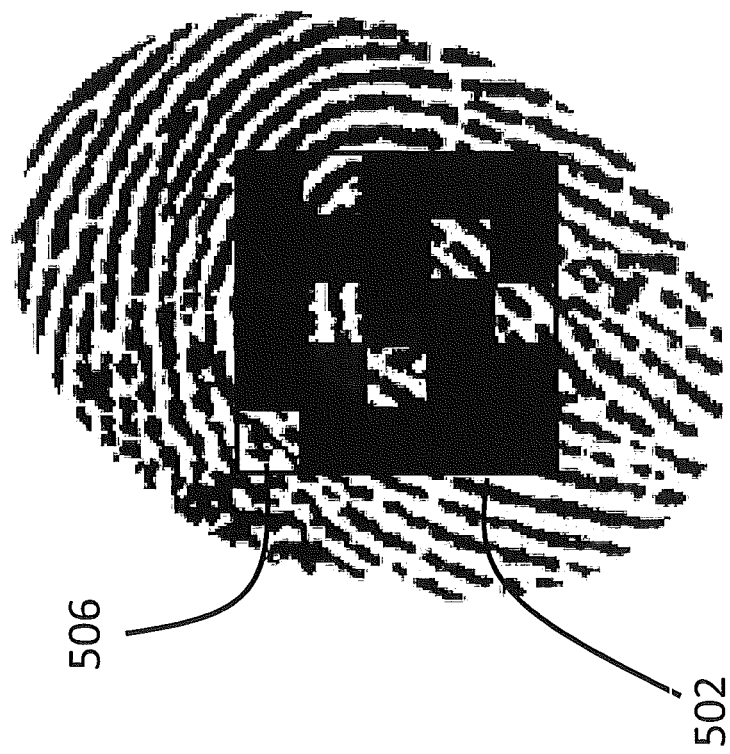
FIG. 4 depicts sampling the input media in an exemplary embodiment.

At 406, input processor 106 samples a portion of the input media 104 by using a mask positioned relative to the reference point 500. FIG. 4 depicts a mask 502 centered on the reference point 500. Mask 502 is square, but it is understood that the mask 502 may have any number of shapes, sizes, granularity, dimensions, etc. Multiple masks 502 may used as well, positioned relative to the reference point or another mask. If the input media 104 includes a time component (e.g., audio or video), multiple masks may be employed over the time series of the input media. The mask serves to sample portions of the input media 104. Although FIG. 4 depicts a two dimensional mask using 1's and 0's for sampling, a mask, as used herein, is any component that samples portions of the input media. The two dimensional representation in FIG. 4 is an exemplary embodiment. A sample 506 of the input media 104 is depicted in FIG. 4.

At 408, samples 506 of the input media 104 sampled by mask 502 are processed to generate cell data. Each cell data may represent any feature of a corresponding sample 506. For example, in the case of a fingerprint image, cell data may represent the mean pixel intensity for a sample 506. Alternatively, cell data may represent edges in the sample 506, determined using an edge detection kernel. If the input media 104 is an audio file, cell data may represent a peak frequency for that sample 506.

Figure 5:
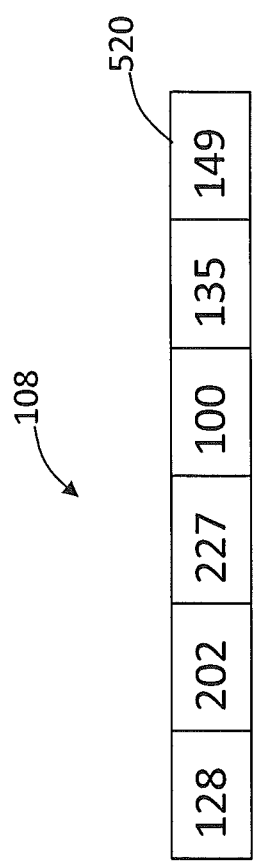
FIG. 5 depicts an input key in an exemplary embodiment.

At 410, the cell data is arranged to form an input key 108. FIG. 5 shows an exemplary input key 108, where the cell data 520 represents mean pixel intensity from the samples 506 of FIG. 4. Cell data 520 may be arranged in any configuration in the input key 108. For example, the cell data in input key 108 may correspond to samples acquired from left to right, and top to bottom of mask 502.

At 412, input key 108 may optionally be encoded and/or encrypted to enhance security, using standard encoding or encryption techniques. At 414, input key 108 is transmitted to the authentication unit 200 to authenticate access to a resource.

Figure 6:
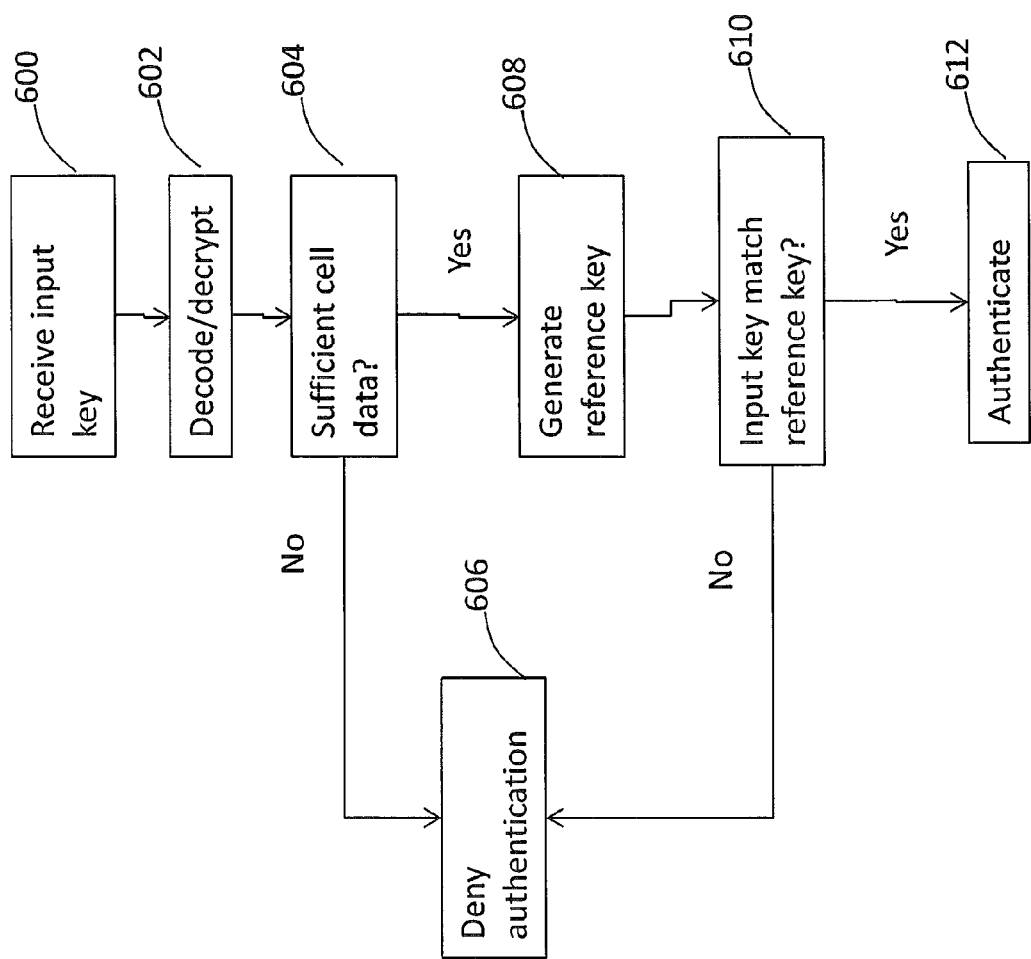
FIG. 6 depicts a process for authentication in an exemplary embodiment.

FIG. 6 depicts a process for authentication in an exemplary embodiment. In general terms, authentication is used to provide access to a resource. The entity requesting access to the resource may be a person, or may be a machine. For example, a user may wish to access a communications channel that requires authentication. In another example, a billing server may request access to a database of customer information and require authentication. As such, environments of authentication are not limited to the examples described herein.

At 600, the input key is received at the authentication unit 200 via network 300. At 602, the input key is decrypted and/or decoded, if such processing was performed at 412. At 604 the amount of data in the input key 108 is determined. This may involve counting the number of cell data 520 in the input key 108, or a measure of the number of bytes making up the input key 108. If the amount of cell 520 data does not meet a threshold, then the authentication system can refuse authentication based on this factor alone, as shown at 606. Using the amount of cell data 520 provides the ability to quickly determine non-authentication. The sampling at 406 may be performed at different resolutions, e.g., low, medium, high. If an input unit 100 has used a low sampling rate (resulting in a low number of cell data), and the resource for which authentication is requested requires high sampling rate, then access to the resource can be denied without attempting to match the input key 108 to a reference key 208. A user would then need to upgrade the input unit 100 to enable a higher sampling rate in order to access the desired resource.

If the amount of cell data is sufficient at 604, then a reference key 208 is generated at 608. The reference key 208 is generated from the reference media 202 using the same process used to generate the input key 108. Authentication processor 206 locates the same reference point and uses the same mask 502 as used by input unit 100. Cell data from samples of the reference media 202 are generated in the same manner as in the input unit 100 and the cell data is arranged into a reference key 208. To enhance security, the technique used to generate the input key 108 and reference key 208 may be altered periodically, as long as both the input unit 100 and the authentication unit 200 employ the same technique.

Generation of reference key at 608 may occur prior to the authentication process, so that reference key 208 is already stored in the authentication unit 200. A new reference key 208 is generated if the reference media 202 is new or updated.

At 610, the input key 108 is compared to the reference key 208 to determine a match. A single reference key 208 is depicted for ease of illustration. The authentication unit 200 may store numerous reference keys 208, and compare the input key 108 to multiple reference keys 208 to determine a match. The determination of a match may be based on a number of cell data 520 matching between the input key 108 and the reference key 208. Alternatively, certain cell data 520 may be required to match to determine that a match exists. Weighting may be used so that matching cell data 520 closest to the reference point 500 is entitled more weight in determining a match, whereas cell data 520 further from the reference point 500 is entitled less weight in determining a match.

If a match is detected between the input key 108 and the reference key 208, access is granted to the resource at 612. If no match is found, then authentication is denied at 606.

The authentication unit 200 may provide the result of the authentication to a third party offering the resource. For example, the input unit 100 may be a communication device (e.g., mobile phone, tablet) through which a user wants to join a video chat. Upon accessing the chat service, the chat service directs the user to authenticate herself by submitting the input media 104. The user may scan their fingerprint using the device (which generated the input key 108) and send the input key 108 to authentication unit 200. The authentication unit 200 authenticates the user as described above, and provides the result to the chat service. In this manner, authentication of users may be performed by authentication unit 200 on behalf of providers of resources. Alternatively, the authentication unit 200 may be an integrated component of the resource provider.

Input unit 100 may be integrated in a variety of devices. In exemplary embodiments, the input unit 100 may be integrated into the CALL/POWER button of a mobile phone, touch screens in automated teller machines, and retail stores kiosks. This allows the user to be authenticated before using such devices. The authentication system may also be applied during voice telephony calls, interviews, business meetings, etc., where users mostly rely on voice prompts and recognitions, chat messenger, conference calls, webpage authentication, social networking. This will prevent misuse of personal information or unauthorized access of devices.

As described above, the exemplary embodiments can be in the form of computer-implemented processes and devices for practicing those processes, such as input processor 106 and authentication processor 206. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for generating an input key for authenticating access to a resource, the method comprising:
   obtaining an input media;
   determining a reference point in the input media;
   sampling the input media in response to determining the reference point to define an input media sample;
   generating cell data from the input media sample; and
   generating the input key using the cell data;
   wherein sampling the input media includes applying a mask to the input media to select a portion of the input media, each portion of the input media sampled by the mask corresponding to a respective one of the cell data, the mask defining a location of the portion of the input media;
   wherein generating the cell data from the input media sample includes processing the input media sample to determine a feature of the input media sample, the cell data corresponding to the feature of the input media sample at the portion of the input media.

2. The method of claim 1 wherein:
   determining the reference point in the input media includes processing the input media to locate a feature in the input media.

3. The method of claim 1 wherein:
   wherein the mask is positioned relative to the reference point to sample the input media.

4. The method of claim 1 wherein:
   generating the input key using the cell data includes arranging the cell data in the input key in a predetermined order.

5. The method of claim 1 further comprising:
   transmitting the input media to an authentication unit to be stored as reference media.

6. The method of claim 1 further comprising:
   encoding the input key.

7. The method of claim 1 further comprising:
   encrypting the input key.

8. An input unit for generating an input key for authenticating access to a resource, the input unit comprising:
   an input device obtaining an input media; and
   an input processor for executing:
      determining a reference point in the input media;
      sampling the input media in response to determining the reference point to define an input media sample;
      generating cell data from the input media sample; and
      generating the input key using the cell data;
      wherein sampling the input media includes applying a mask to the input media to select a portion of the input media, each portion of the input media sampled by the mask corresponding to a respective one of the cell data, the mask defining a location of the portion of the input media;
      wherein generating the cell data from the input media sample includes processing the input media sample to determine a feature of the input media sample, the cell data corresponding to the feature of the input media sample at the portion of the input media.

9. The input unit of claim 8 wherein:
   determining the reference point in the input media includes processing the input media to locate a feature in the input media.

10. The input unit of claim 8 wherein:
    wherein the mask is positioned relative to the reference point to sample the input media.

11. The input unit of claim 8 wherein:
    generating the input key using the cell data includes arranging the cell data in the input key in a predetermined order.

12. The input unit of claim 8 wherein:
    the input device is an imaging device and the input media is an image.

13. A computer program product tangibly embodied on a non-transitory computer readable storage medium, the computer program product including instructions for causing a processor to execute a method, comprising:
    obtaining an input media;
    determining a reference point in the input media;

sampling the input media in response to determining the reference point to define an input media sample;
generating cell data from the input media sample; and
generating the input key using the cell data;
wherein sampling the input media includes applying a mask to the input media to select a portion of the input media, each portion of the input media sampled by the mask corresponding to a respective one of the cell data, the mask defining a location of the portion of the input media;
wherein generating the cell data from the input media sample includes processing the input media sample to determine a feature of the input media sample, the cell data corresponding to the feature of the input media sample at the portion of the input media.

14. The computer program product of claim 13 wherein:
determining the reference point in the input media includes processing the input media to locate a feature in the input media.

15. The computer program product of claim 13 wherein:
generating the input key using the cell data includes arranging the cell data in the input key in a predetermined order.

16. A method for authenticating access to a resource, the method comprising:
obtaining a reference media;
determining a reference point in the reference media;
sampling the reference media in response to determining the reference point to define a reference media sample;
generating reference cell data from the reference media sample;
generating a reference key using the reference cell data;
receiving an input key; and
comparing the input key to the reference key to authenticate access to the resource;
wherein comparing the input key to the reference key includes comparing a sampling resolution of the input cell data in the input key to the sampling resolution of the reference cell data in the reference key, wherein authentication is denied in response to sampling resolution of the input cell data in the input key being less than the sampling resolution of the reference cell data in the reference key.

* * * * *